(12) United States Patent
Hentunen (10) Patent No.: US 10,447,724 B2
(45) Date of Patent: Oct. 15, 2019

(54) PREVENTING SECURITY THREATS IN A COMPUTER NETWORK

(71) Applicant: F-Secure Corporation, Helsinki (FI)

(72) Inventor: Daavid Hentunen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 313 days.

(21) Appl. No.: 15/604,769

(22) Filed: May 25, 2017

(65) Prior Publication Data

US 2017/0346849 A1 Nov. 30, 2017

(30) Foreign Application Priority Data

May 31, 2016 (GB) .................................. 1609472.4

(51) Int. Cl.
*H04L 29/06* (2006.01)
*G06F 21/55* (2013.01)

(52) U.S. Cl.
CPC ........ *H04L 63/1441* (2013.01); *G06F 21/554* (2013.01); *G06F 21/556* (2013.01); *H04L 63/10* (2013.01); *H04L 63/1408* (2013.01)

(58) Field of Classification Search
CPC . H04L 63/1441; H04L 63/10; H04L 63/1408; G06F 21/554; G06F 21/556
See application file for complete search history.

(56) References Cited

U.S. PATENT DOCUMENTS

| 8,151,348 B1 * | 4/2012 | Day ................... H04L 63/1408 709/224 |
| 2016/0127395 A1 * | 5/2016 | Underwood ........ H04L 63/1416 726/23 |

* cited by examiner

*Primary Examiner* — Hee K Song
(74) *Attorney, Agent, or Firm* — Harrington & Smith (57) ABSTRACT

Aspects of the invention relate to a method for preventing communication through covert channels in a Local Area Network (LAN). The method includes suspending an inbound or an outbound network connection related to a network element for a predetermined period of time, determining if any respective outbound or inbound network connection related to the same or any other network element ceases to transmit for the duration of the time period predetermined, if an outbound or inbound network connection is detected to cease transmission, concluding that the inbound or outbound network connection suspended and the respective outbound or inbound network connections are connected, determining whether the connected network connections use different transmission protocols and if the connected network connections are detected to use different transmission protocols, determining that the connected network connections are related to a malicious covert channel and taking action to prevent the malicious covert channel from working.

12 Claims, 5 Drawing Sheets

PREVENTING SECURITY THREATS IN A COMPUTER NETWORK

FIELD

The present invention relates to network security threat prevention. More specifically, the present invention relates to measures (including methods, apparatuses and computer program products) for realizing detection and prevention of security threats caused by covert channels in a computer network.

BACKGROUND

In modern communication networks, security is a vital issue, and attacks on network security tend to be increasing in terms of both number and complexity.

In computer security, covert channels are used by attackers to create capabilities to transfer information between processes that are not supposed to be communicating with each other. Covert channels are hidden from the access control mechanisms of secure operating systems since they do not use legitimate data transfer mechanisms and therefore cannot be detected easily.

For example, it is evident that if an attacker has a visibility to all encrypted traffic passing for example through all Tor-network nodes, then he/she could do correlation analysis and conclude which connections entering the Tor-network correspond to which connections exiting the Tor-network. This would in effect defeat the purpose of the Tor-network altogether.

Figure 1:
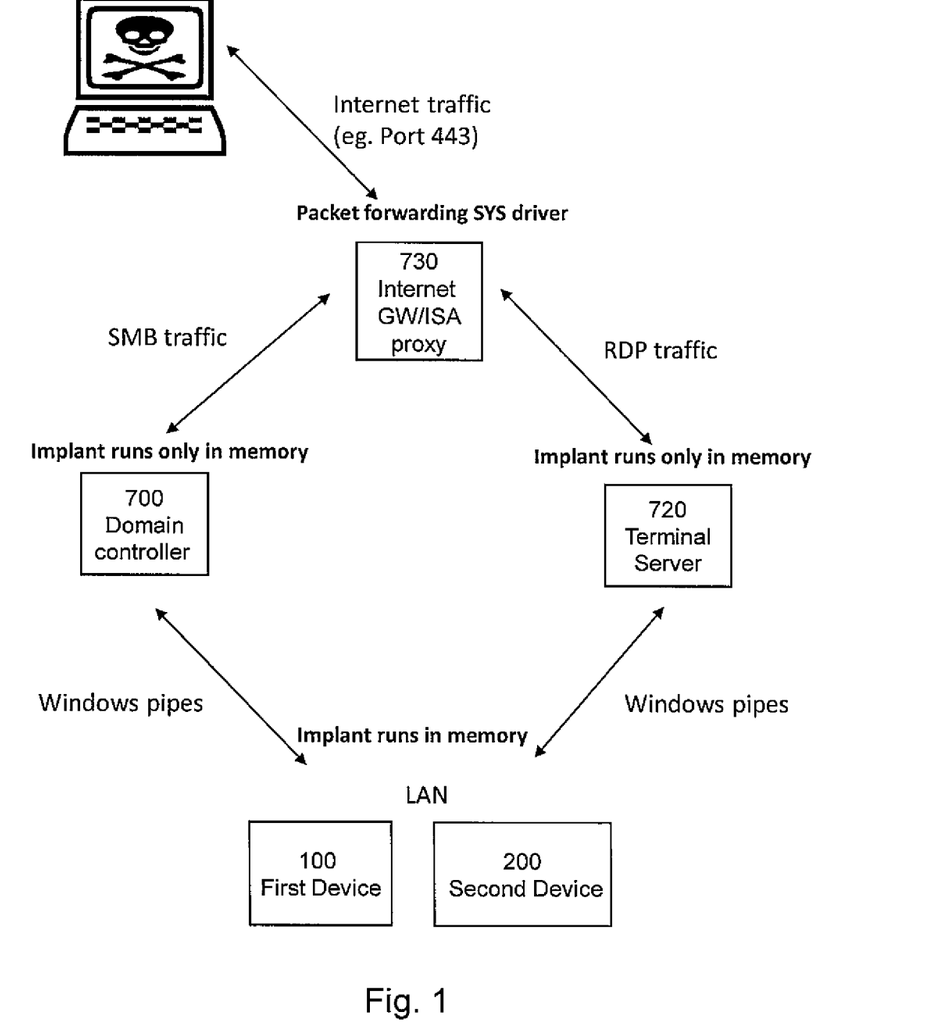
FIG. 1 is a block diagram illustrating an example of an attack scenario.

Duqu2 is one example of an advanced persistent threat (APT) type version of malware that has infected computers in local area networks (LAN) by setting different roles or functions for the computer devices. FIG. 1 illustrates one example of this kind of an attack where one of the devices 100, 200 with high uptime were acting as an Internet gateway 730 and few of the devices with high uptime were acting as domain controllers 700 or terminal servers 720. Most of the other devices were client devices 100, 200. What is to note about these differing roles of these devices is that communication protocols or ports used between the different roles also differ. For example malware in clients and domain controllers communicate with each other through Windows pipes, malware in domain controllers and gateway communicate with each other through SMB or RDP protocols, and malware in gateway communicates with the attacker in the Internet by using port 443 for making the traffic look like it was HTTPS. Further, some of the modules in client computers are interactive in nature ("24B7—Remote desktop administration", "9224—Run console applications") while other modules are not ("0682—Collects basic system information", "09A0—64-bit, Exfiltrates file contents", "0AB8—Provides 25 functions for manipulating files and directories". For someone looking at the traffic in LAN or exiting LAN, it all looks normal: devices seem, to communicate with each other with protocols that they are expected to use.

There is a need to detect covert channel traffic such as this and to prevent security threats caused by covert channels to computer systems.

SUMMARY

Various exemplifying embodiments of the present invention aim at addressing at least part of the above issues and problems.

Various aspects of exemplifying embodiments of the present invention are set out in the appended claims.

By way of exemplifying embodiments of the present invention, there is provided network abuse prevention. More specifically, by way of exemplifying embodiments of the present invention, there are provided measures and mechanisms for realizing security threats prevention in a computer network.

Thus, improvement is achieved by methods, apparatuses and computer program products enabling/realizing prevention of communication through covert channels.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the present invention is by no means limited to these examples, and may be more broadly applied.

Hereinafter, various exemplifying embodiments and implementations of the present invention and its aspects are described using several variants and/or alternatives. It is generally noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present invention, in general terms, there are provided measures and mechanisms for (enabling/realizing) security threats prevention in computer network, as described in more details below.

While the invention is particularly directed to local area networks (LANs) and will be described with examples with specific reference thereto, the invention may have usefulness in other fields and applications as well. For example, some embodiments may be used in various wireless or wired communication networks.

Figure 2:
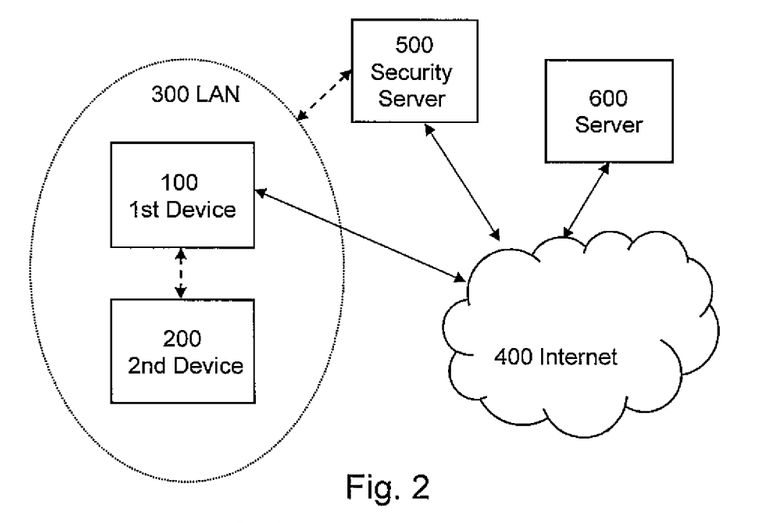
FIG. 2 is a block diagram illustrating an example of a system configuration according to exemplifying embodiments of the present invention.

FIG. 2 shows a schematic diagram illustrating a system configuration underlying exemplifying embodiments of the present invention.

The network includes a first network element 100 and a second network element 200, both in a Local Area Network (LAN) 300 such as a home LAN. The devices are connected via a home router (not shown). In this example, the first network element 100 is connected to Internet 400 via the home router whilst the second network element 200 is not connected to the Internet. Through its Internet connection, the network elements 100, 200 may be capable of establishing a connection to a security server 500. The network-elements 100, 200 are also capable of establishing a connection (perhaps unwittingly) to a malicious server 600.

The first and the second network elements 100, 200 may be user/client devices such as a home PC, smartphone or laptop. Although the example FIG. 2 only shows two network elements 100, 200, there may be any number of further network elements in the network. It is possible that one of the network elements 100, 200 may be a device without the capability to browse web pages and read emails, such a Smart TV or an external hard drive.

Figure 3:
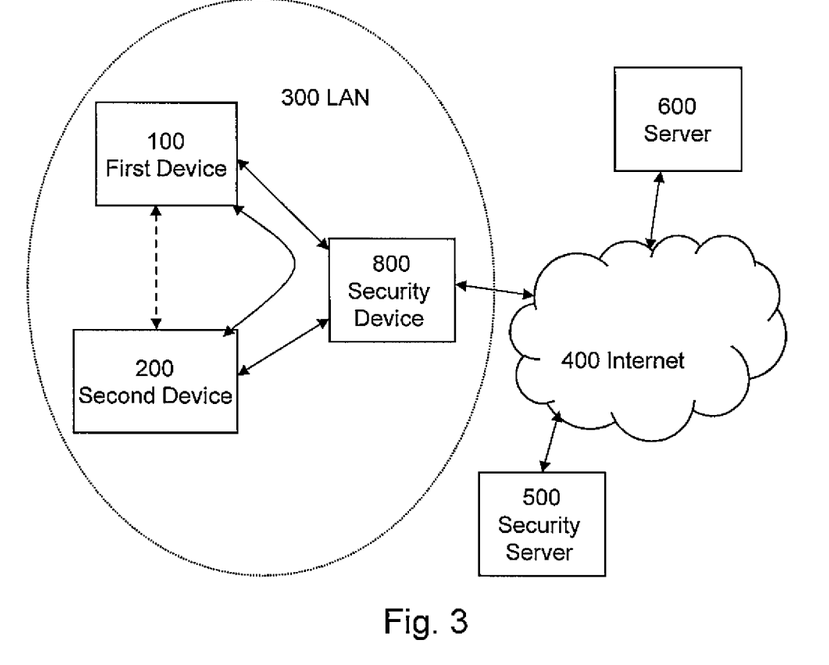
FIG. 3 is a block diagram illustrating an example of a system configuration according to exemplifying embodiments of the present invention.

FIG. 3 is an architecture diagram of an embodiment where the method for preventing communication through covert channels may be implemented at a security device 800 within a Local Area Network 300. The security device 800 may also reside elsewhere but is capable of communicating with one or more network elements of the local area network 300. The network shown in FIG. 3 includes all of the elements of the exemplary network of FIG. 2, but further comprises a security device 800 located in the Local Area Network 300. The security device 800 in this example is connected to the first and the second network elements 100, 200, for example, via a home router (not shown). The security device 800 is also connected to the Internet 400 via the home router. Through the Internet connection, the security device 800 is capable of establishing connections to the security server 500 and the malicious server 600.

The security device 800 may be a separate physical device or may be new functionality provided to a home router of the LAN 300. The security device 800 is able to intercept and filter inbound and outbound network traffic of the first network element 100 and the second network element 200.

The skilled person will appreciate that the exemplary network shown in FIGS. 2 and 3 serve for illustration and explanation purposes. In other exemplary networks, any number of devices may reside in the Local Area Network. Of course, these devices may connect to any number of nodes and/or other devices in the Local Area network in numerous ways via the home router or otherwise. Further, the devices may connect with any number of nodes and/or other devices in other remote networks. A security server and/or the security device may reside inside or outside a Local Area Network.

It is noted that the term "electrical communication", unless otherwise stated, encompasses any one of wired and wireless electrical communication, or both. Therefore, electrical communication may be, for example, a network communication over a wired connection or a network communication over a radio frequency connection, or both.

Figure 4:
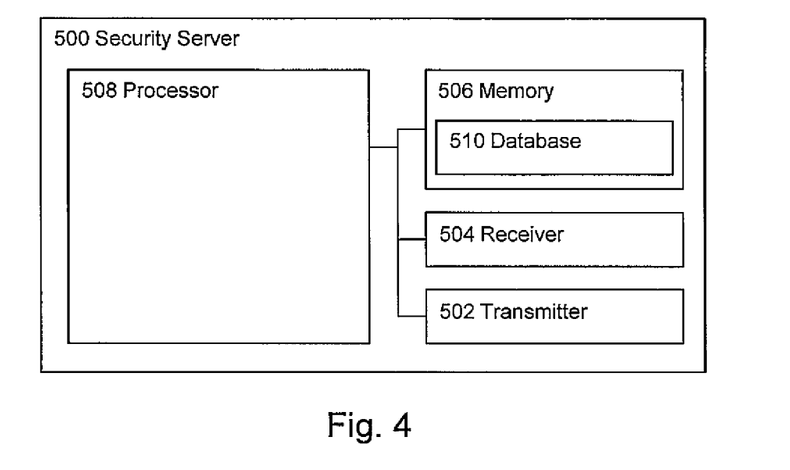
FIG. 4 is a block schematic diagram displaying a security server of an exemplary network.

FIG. 4 shows a block schematic diagram displaying the security server of the exemplary network of FIG. 2. The security server 500 comprises a transmitter 502 and a receiver 504. The transmitter 502 and receiver 504 may be in electrical communication with other communication units, user equipment, servers and/or functions and are configured to transmit and receive data accordingly.

The security server 500 further comprises a memory 506 and at least one processor 508. The memory 506 may comprise a non-volatile memory and/or a volatile memory. The memory 506 has a database 510 stored therein and may also store one or more programs. The database 510 may store information related to the first and the second network element 100, 200 and/or the Local Area Network 300. Computer programs stored in the memory 506 may be implemented by the processor 508. The processor 508 may be configured to run queries on the database 510 and return information and/or indications arising from the queries. Each of the transmitter 502 and receiver 504, memory 506 and processor 508 is in electrical communication with the other features 502, 504, 506, 508 and 510 of the security server 500.

The security server 500 may have some or all of the functionality of the first network element 100. In some exemplary systems, the security server 500 may be integrated with the first network element 100 inside the Local Area Network.

Figure 5:
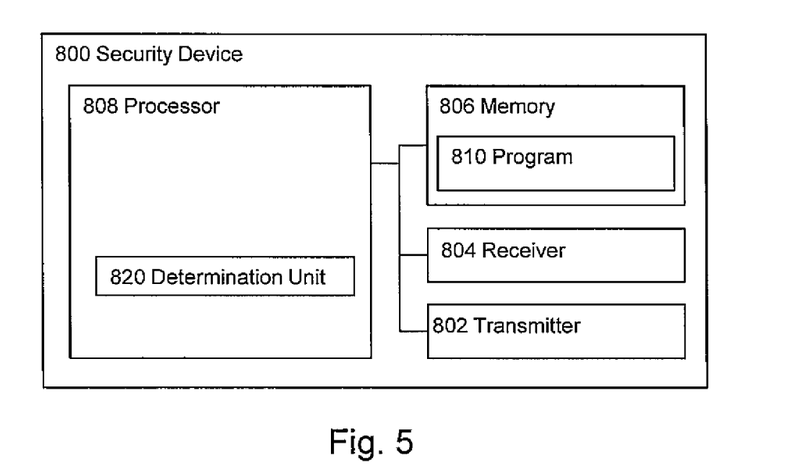
FIG. 5 is a block schematic diagram displaying a security device.

FIG. 5 shows a block schematic diagram displaying the security device 800 of FIG. 2. The security device 800 comprises a transmitter 802 and a receiver 804. The transmitter 802 and receiver 804 may be in electrical communication with other communication units, user equipment, servers and/or functions in the Local Area Network 300, and are configured to transmit and receive data accordingly.

The security device 800 further comprises a memory 806 and at least one processor 808. The memory 806 may comprise a non-volatile memory and/or a volatile memory. The memory 806 may have a computer program 810 stored therein. The computer program 810 may be configured to undertake methods disclosed herein. The computer program 810 may be loaded in the memory 806 from a non-transitory computer readable medium 812 on which the computer program 810 is stored. The processor 808 is configured to undertake at least the functions of a determination unit 820.

Each of the transmitter 802 and receiver 804, memory 806, processor 808 and determination unit 820 is in electrical communication with the other features of the security device 800.

The security device 800 can be implemented as a combination of computer hardware and software. In particular, determination unit 820 may be implemented as software configured to run on the processor 808. The memory 806 stores the various programs/executable files that are implemented by a processor 808, and also provides a storage unit for any required data. The programs/executable files stored in the memory 806, and implemented by the processor 808, can include the determination unit 820.

In some exemplary security devices, a security server may be integrated into a security device. The security device would have the same functionality as the security server.

Figure 6:
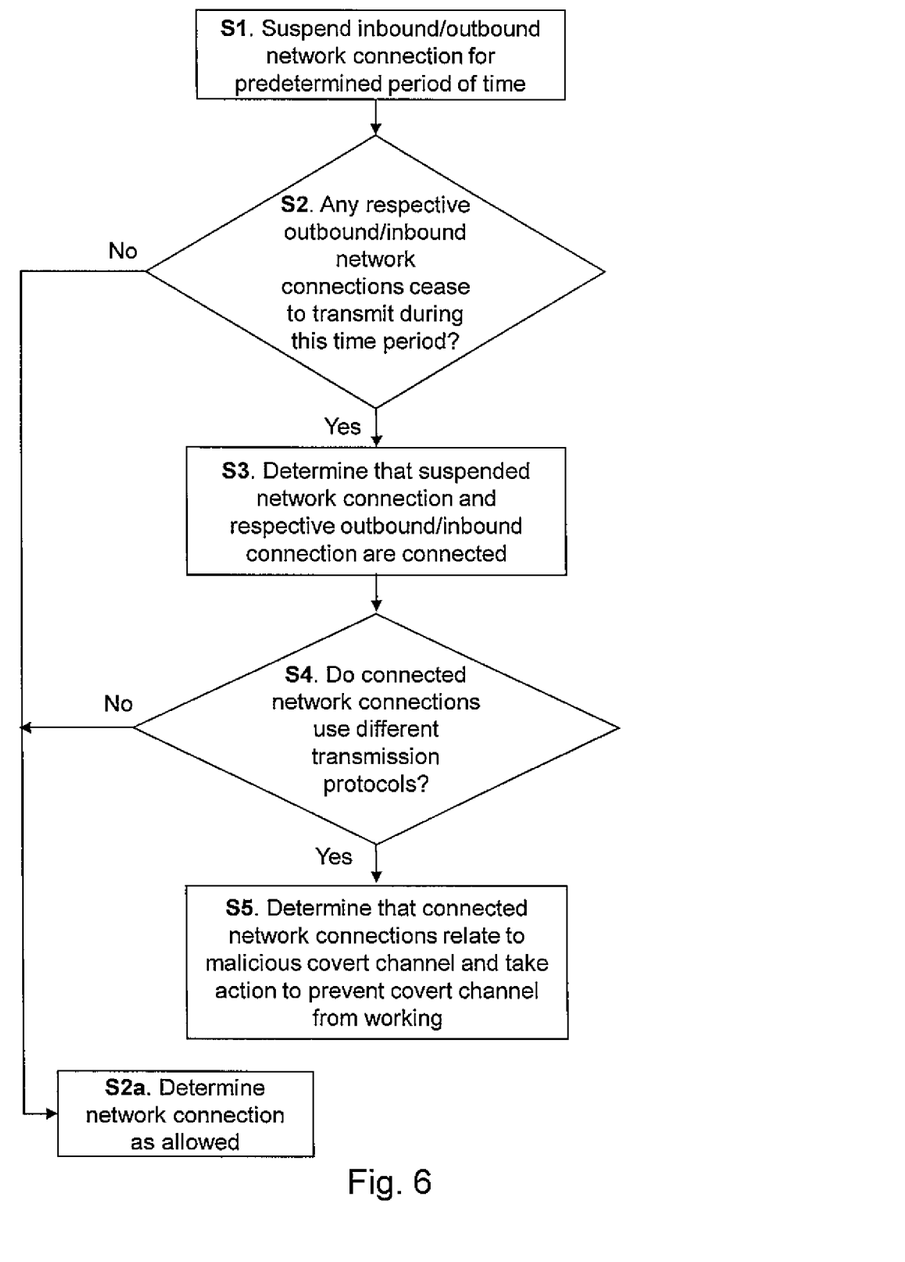
FIG. 6 is a flow diagram of an exemplary method for preventing communication through covert channels.

FIG. 6, is a flow diagram of an exemplary method for preventing communication through covert channels.

S1. The security device/server first suspends an inbound (or outbound) network connection related to a network element for a predetermined period of time.

S2. Next the security device/server detects and determines whether any respective outbound (or inbound) network connection related to the same or any other network element ceases to transmit for the duration of the time period that was predetermined in step S1.

If yes, then S3 is entered where the security device/server concludes that the inbound (or outbound) network connection suspended in step S1 and the respective outbound (or inbound) network connection are connected. If no such network connection that ceases to transmit for the predetermined time period is detected, then S2a may be entered where it is determined that the network connection is allowed and no further action is required.

S4. Next the security device/server determines whether the connected network connections use different transmission protocols.

If yes, then S5 is entered where the security device/server concludes that the connected network connections relate to a malicious covert channel and action(s) is taken to prevent the covert channel from working. If not, then S2a may be entered where it is determined that the network connection is allowed.

In an embodiment, the steps S1 to S4 are repeated one or more times before the step S5 determination is processed. This may result in more reliable results.

In an embodiment, taking action to prevent the malicious covert channel from working may comprise for example denying a connection corresponding to said network connection and/or generating an alert including information regarding said network connection related to the malicious covert channel.

In an embodiment, the network traffic related to a single device or network element is suspended and the observation of the network traffic suspension in step S2 may also be related to this same single device. In another embodiment, the network traffic suspension is related to one network element but the observation of the network traffic suspension may be related also to some other network element. For example, the traffic suspension may be related to traffic between an end-point client device and domain controller server, but then the observation on the Internet side may be intended to detect whether any of those connections related to a gateway cease to transmit.

The above-described procedures and functions may be implemented by respective functional elements, entities, modules, units, processors, or the like.

While in the foregoing exemplifying embodiments of the present invention are described mainly with reference to methods, procedures and functions, corresponding exemplifying embodiments of the present invention also cover respective apparatuses, entities, modules, units, nodes and systems, including both software and/or hardware thereof.

Figure 7:
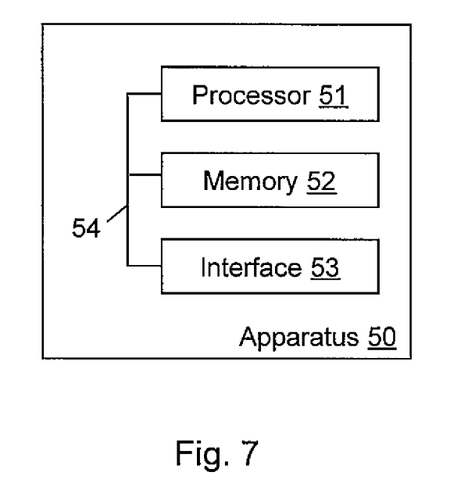
FIG. 7 is a block diagram illustrating an example of a structure of an apparatus.

FIG. 7 shows a schematic diagram illustrating an example of a structure of an apparatus according to exemplifying embodiments of the present invention.

As indicated in FIG. 7, an apparatus 50 according to exemplifying embodiments of the present invention may comprise at least one processor 51 and at least one memory 52 (and possibly also at least one interface 53), which may be operationally connected or coupled, for example by a bus or the like, respectively.

The processor 51 of the apparatus 50 is configured to read and execute computer program code stored in the memory 52. The processor may be represented by a CPU (Central Processing Unit), a MPU (Micro Processor Unit), etc, or a combination thereof. The memory 52 of the apparatus 50 is configured to store computer program code, such as respective—programs, computer/processor-executable instructions, macros or applets, etc. or parts of them. Such computer program code, when executed by the processor 51, enables the apparatus 50 to operate in accordance with exemplifying embodiments of the present invention. The memory 52 may be represented by a RAM (Random Access Memory), a ROM (Read Only Memory), a hard disk, a secondary storage device, etc., or a combination of two or more of theses. The interface 53 of the apparatus 50 is configured to interface with another apparatus and/or a user of the apparatus 50. That is, the interface 53 may represent a communication interface (including e.g. a modem, an antenna, a transmitter, a receiver, a transceiver, or the like) and/or a user interface (such as a display, touch screen, keyboard, mouse, signal light, loudspeaker, or the like).

The apparatus 50 may, for example, represent a (part of a) the network element 100, 200 in FIG. 1, or may represent a (part of a) the security device 800 in FIG. 2. Additionally, the security device 800 in FIG. 2 may be embodied in a similar manner. The apparatus 50 may be configured to perform a procedure and/or exhibit a functionality as described in any one of Figures.

Accordingly, any one of the above-described schemes, methods, procedures, principles and operations may be realized in a computer-implemented manner.

According to exemplifying embodiments of the present invention, any one of the processor, the memory and the interface may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of the thus depicted devices/apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device/element/server may be regarded as a device/apparatus or as an assembly of more than one device/apparatus, whether functionally in cooperation with each other or functionally independently of each other but in a same device housing, for example.

Apparatuses and/or units and/or elements, means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible or non-transitory medium such as a computer-readable (storage) medium having stored thereon a respective data structure or code means/portions or embodied in a signal or in a chip, potentially during processing thereof. A computer program product encompasses a computer memory encoded with executable instructions representing a computer program for operating/driving a computer connected to a network.

The present invention also covers any conceivable combination of method steps and operations described above, and any conceivable combination of nodes, apparatuses, modules or elements described above, as long as the above-described concepts of methodology and structural arrangement are applicable.

Even though the invention is described above with reference to the examples and exemplifying embodiments with reference to the accompanying drawings, it is to be understood that the present invention is not restricted thereto. Rather, it is apparent to those skilled in the art that the above description of examples and exemplifying embodiments is for illustrative purposes and is to be considered to be exemplary and non-limiting in all respects, and the present invention can be modified in many ways without departing from the scope of the inventive idea as disclosed herein.

The invention claimed is:

1. A method for preventing communication through covert channels in a Local Area Network (LAN), the method comprising:
   A) suspending an inbound or an outbound network connection related to a network element for a predetermined period of time;
   B) determining if any respective outbound or inbound network connection related to the same or any other network element ceases to transmit for the duration of the time period predetermined in step A);
   C) if an outbound or inbound network connection is detected to cease transmission in step B), concluding that the inbound or outbound network connection suspended in step A) and the respective outbound or inbound network connections are connected;
   D) detecting whether connected network connections use different transmission protocols; and
   E) if the connected network connections are detected to use different transmission protocols, determining that the connected network connections are related to a malicious covert channel and taking action to prevent the malicious covert channel from working.

2. The method according to claim 1, wherein steps A) to D) are repeated one or more times before the step E) determination is processed.

3. The method according to claim 1, wherein if the connected network connections are not detected to use different transmission protocols, the method comprises judging the connected network connections as allowed.

4. The method according to claim 1, wherein taking action to prevent the malicious covert channel from working comprises any of: denying a connection corresponding to said network connections generating an alert including information regarding said connected network connections related to a malicious covert channel.

5. An apparatus, comprising
   a memory configured to store computer program code, and
   a processor configured to read and execute computer program code stored in the memory,
   wherein the processor is configured to cause the apparatus to perform:
   A) suspending an inbound or an outbound network connection related to a network element for a predetermined period of time;
   B) determining if any respective outbound or inbound network connection related to the same or any other network element ceases to transmit for the duration of the time period predetermined in step A);
   C) if an outbound or inbound network connection is detected to cease transmission in step B), concluding that the inbound or outbound network connection suspended in step A) and the respective outbound or inbound network connections are connected;
   D) detecting whether connected network connections use different transmission protocols; and
   E) if the connected network connections are detected to use different transmission protocols, determining that the connected network connections are related to a malicious covert channel and taking action to prevent the malicious covert channel from working.

6. The apparatus according to claim 5, wherein said processor is configured to cause the apparatus to perform: repeating steps A) to D) one or more times before the step E) determination is processed.

7. The apparatus according to claim 5, wherein if the connected network connections are not detected to use different transmission protocols, the processor is configured to cause the apparatus to judge the connected network connections as allowed.

8. The apparatus according to claim 5, wherein taking action to prevent the malicious covert channel from working comprises any of: denying a connection corresponding to said network connection, generating an alert including information regarding said connected network connections related to a malicious covert channel.

9. A non-transitory computer storage medium having stored thereon a computer program code for implementing preventing communication through covert channels in a Local Area Network (LAN), comprising:
   A) suspending an inbound or an outbound network connection related to a network element for a predetermined period of time;
   B) determining if any respective outbound or inbound network connection related to the same or any other network element ceases to transmit for the duration of the time period predetermined in step A);
   C) if an outbound or inbound network connection is detected to cease transmission in step B), concluding that the inbound or outbound network connection suspended in step A) and the respective outbound or inbound network connections are connected;

D) detecting whether connected network connections use different transmission protocols; and E) if the connected network connections are detected to use different transmission protocols, determining that the connected network connections are related to a malicious covert channel and taking action to prevent the malicious covert channel from working.

10. The non-transitory computer storage medium storing the computer program code according to claim 9, wherein steps A) to D) are repeated one or more times before the step E) determination is processed.

11. The non-transitory computer storage medium storing the computer program code according to claim 9, wherein if the connected network connections are not detected to use different transmission protocols, and comprising judging the connected network connections as allowed.

12. The non-transitory computer storage medium storing the computer program code according to claim 9, wherein taking action to prevent the malicious covert channel from working comprises any of: denying a connection corresponding to said network connection, generating an alert including information regarding said connected network connections related to a malicious covert channel.

* * * * *

UNITED STATES PATENT AND TRADEMARK OFFICE
CERTIFICATE OF CORRECTION

PATENT NO. : 10,447,724 B2  
APPLICATION NO. : 15/604769  
DATED : October 15, 2019  
INVENTOR(S) : Daavid Hentunen Page 1 of 1

It is certified that error appears in the above-identified patent and that said Letters Patent is hereby corrected as shown below:

In the Claims

In Claim 4:
Column 8, Line 11, "connections" should be deleted and -- connection, -- should be inserted.

Signed and Sealed this
Twenty-sixth Day of November, 2019

Andrei Iancu
*Director of the United States Patent and Trademark Office*